Jan. 20, 1970   D. N. HUNDER ET AL   3,490,122
METHOD OF MAKING AN IN-LINE PIPE CONNECTION
Original Filed April 26, 1965
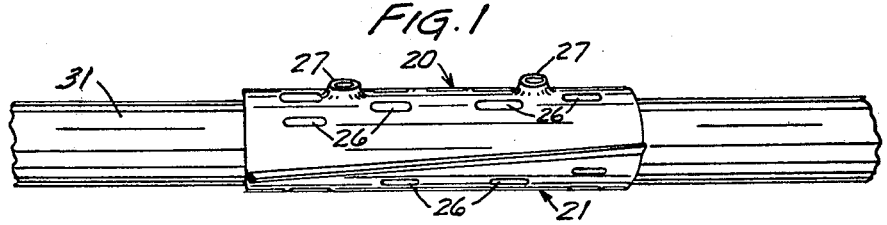
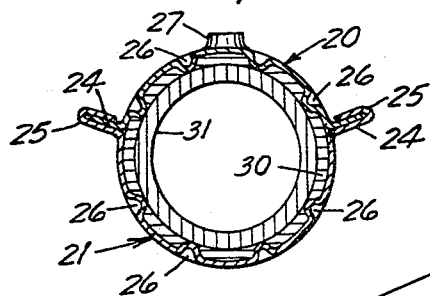
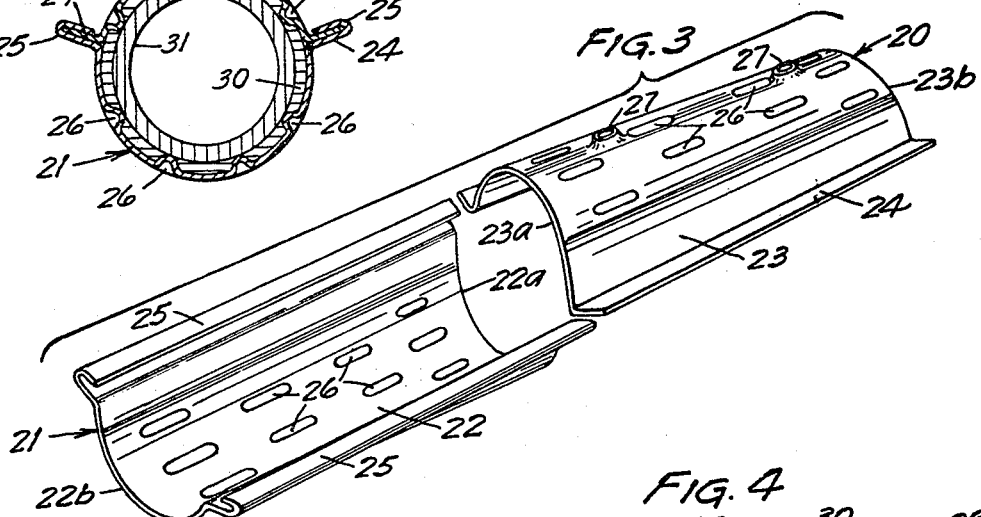
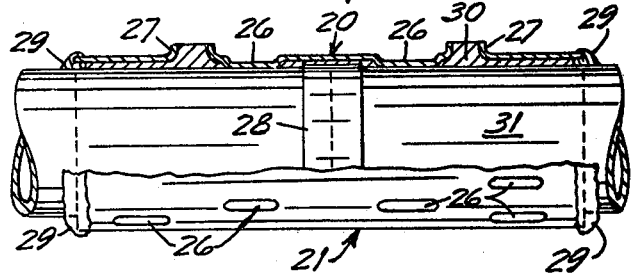
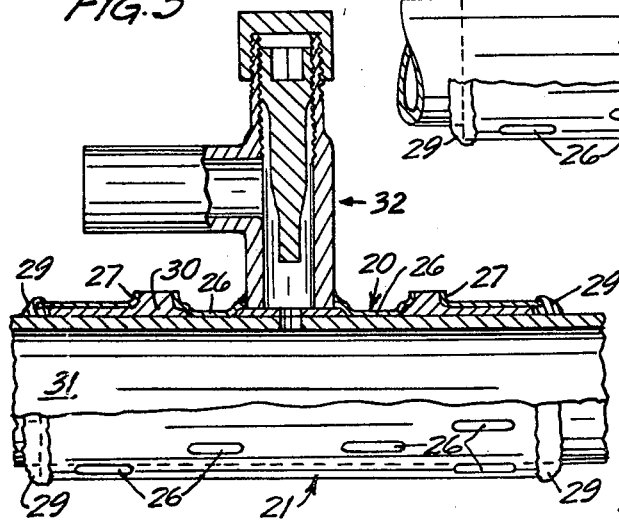
INVENTORS
DAVID N. HUNDER
RICHARD G. EIKOS
BY Kinney, Alexander,
Sell, Steldt & De La Hunt
ATTORNEYS United States Patent Office 3,490,122
Patented Jan. 20, 1970

3,490,122
METHOD OF MAKING AN IN-LINE PIPE CONNECTION
David N. Hunder, Woodbury Township, Washington County, and Richard G. Eikos, Brooklyn Center, Minn., assignors to Minnesota Mining and Manufacturing Company, St. Paul, Minn., a corporation of Delaware
Original application Apr. 26, 1965, Ser. No. 450,912, now Patent No. 3,406,987, dated Oct. 22, 1968. Divided and this application Oct. 4, 1967, Ser. No. 708,733
Int. Cl. B21d *39/00;* B23p *19/04*
U.S. Cl. 29—157                                    1 Claim

ABSTRACT OF THE DISCLOSURE

An assembly useful in joining pipes, repairing pipes, or in making connections to pipes, comprising generally two sheet metal casings which together form a cylinder and which have inclined flanges and flange receiving guides for clamping the casings around a pipe, the casings having inwardly directed indentations for spacing the casing away from the pipe thereby forming a mold; and methods of forming a pipe joint or pipe connection utilizing the above described assembly and including filling the mold with a sealant.

---

This application is a division of application Ser. No. 450,912, filed Apr. 26, 1965, now Patent No. 3,406,987.

This invention pertains to pipe connections, particularly to apparatus and a method for joining together the ends of lengths of pipe as well as to apparatus and a method for making lead-off connections to continuous lengths of pipe. The invention disclosed in this application also has other uses, such as the sealing of holes or cracks in pipes.

Use of this invention obviates some of the disadvantages of conventional methods of joining together lengths of pipe when installing pipelines for the transmission of fluids. More specifically, use of the invention reduces the labor and equipment expense which arises in joining lengths of pipe together and in making lead-off connections to continuous lengths of pipe and results in a structurally strong and leakproof connection.

The usual practice in the installation of underground pipelines, for instance, those used in the transmission of natural gas, is to join the pipe lengths together alongside the ditch into which the pipe will be lowered. Welding is one method generally employed to join separate pipes together, in which case the ends of the pipes are aligned by a line-up clamp and then welded. Normally a number of tack welds are first made around the juncture of the two pipes. The pipes are thereby held in alignment and removal of the line-up clamp is possible. Then a stringer bead weld is made around the pipes at the point of abutment. One bead weld is then made on each side of the stringer bead. On a 2 inch diameter pipe the time consumed by the welder at each juncture is only approximately 4–5 minutes. But the disadvantage of welding the pipes together is not the time it takes but the expense of the labor and equipment involved. The welder, who is highly skilled, plus any required helpers, and the welding equipment are all needed to join the pipes together. It frequently happens that the welder is without work and delayed while the regular crew is negotiating around a corner or a tree, with the attendant additional expense. In the situations where a lead-off connection, known also as a tap, is to be attached to a length of pipe, as in opening up new service or in a service renewal, the welder and the equipment are required as well as the regular crew of workers. However, the welder and equipment are only needed to attach the tapping T, which job takes but a few minutes, whereas the whole job takes about four hours.

A non-welded means for joining together lengths of pipe is the mechanical compression type coupling. Generally, to form this structure, compressible O-rings, usually rubber, are mechanically compressed to form a seal between the pipes and a cooperating sleeve. The compression of the O-rings is usually accomplished by threaded end caps or by bolts extending the length of the sleeve. Although no special skills are required to assemble a compression coupling, the resultant joint has considerably less pull-out strength than welded connections or the connection of this invention.

Thus, a real need exists for a method of joining lengths of pipes together and of making tapping connections which does not require the services of a welder but which can be done by a regular crew, none of whom need any special welding skills. A method which yields an effective connection, leakproof under normal distribution pressures up to 50–60 p.s.i. and even somewhat higher, and having strong resistance to pull-out, and which can be applied by a person without any special skills, would result in considerable labor savings. The invention disclosed in this application provides such a method.

The present invention also embraces a two member apparatus assembly. The apparatus assembly in combination with a sealant filler composition forms a structurally strong and leakproof permanent-type connection as taught herein.

In the drawing made a part hereof:

FIGURE 1 is a perspective view of an assembly about a pipe joint.

FIGURE 2 is a cross sectional view showing the position of pipe within the assembly, the sealant, and also the means by which the upper and lower casings are fastened to each other around the pipe.

FIGURE 3 shows the two members of the assembly in position prior to engagement.

FIGURE 4, partially in section, shows the pipe parts, apparatus assembly, temporary seal (e.g. tape), putty, and sealant of a composite pipe joint of the invention.

FIGURE 5, partially in section, shows the pipe, apparatus assembly, putty, and sealant of a tapping connection.

Referring to FIGURE 3, the apparatus assembly consists of two parts, an upper member 20 and a lower member 21. Each member has a casing, 22 and 23, which is a hemi-cylindrical sheet part having substantially the shape of one part of an open-ended cylinder cut into two parts by an inclined plane passing through the ends of the cylinder. Preferably one end edge of the casing should be more than a half-circle, 22a and 23a, while the other is less, 22b and 23b. The upper member has flanges 24 disposed along the longitudinal edges of the casing 23. These flanges 24 extend outwardly and preferably upwardly from the longitudinal edges of the casing 23. The lower member has ear-shaped guides 25 disposed along the longitudinal edges of the casing 22. The guides 25 extend outwardly and preferably upwardly from the longitudinal edges of the lower casing 22. Having the flanges and guides extending upwardly provides a trough-like place where a stringer or line of sealant can be applied for better protection against corrosion. The assembly is secured around the pipe by inserting the flanges 24 of the upper member into the cooperating ear-shaped guides 25 of the lower member with a sliding longitudinal motion. The inclination of the flanges and guides produces a clamping action on the pipe about which the casing parts are disposed; and that inclination also causes the casings to remain parallel to each other when the members are slid together, even though the meshing of the two casing parts together may not result in perfect alignment of the end edges of the upper and lower parts. The lack of perfect alignment is particularly noticeable where larger or smaller pipe is used than that for which the parts were ideally designed. In short, because the casings remain parallel to each other irrespective of precise alignment transversely to the axis of the pipe, the assembly is versatile in use in that it can handle a wider range of pipe diameters; and also the assembly is secured relatively tightly or snugly to the pipe throughout its length even though pipe diameters may vary.

As best illustrated by FIGURES 2 and 3, the casings are formed with indentations or spacing means 26. As the casings are placed about pipe, the indentations 26 positively space the casings uniformly and in a spacedly snug relationship around the pipe. The result is that of providing an essentially uniformly thick space between the outer diameter of the pipe and inner surface of the casings. In the final connection, this space is occupied by sealant at a substantially uniform thickness.

The indentations are preferably spaced so as to leave the area near the joint between the lengths of pipe free of the same (see FIGURE 4). This permits the sealant 30 to occupy that critical area and also insures that tape wrapped around the splice, when tape is used, will not be disturbed. However, suitable joints have been made even when spacer members have bridged over the joint between segments of pipe. Also, it is desirable to have the indentions running longitudinally with the casings to facilitate the sliding movement of the members when being fastened to each other around the pipe.

One of the members, preferably the upper one, is provided with at least one and preferably two openings 27, preferably one or both shouldered as illustrated; and the openings are longitudinally spaced along the member, preferably on the top and near the ends thereof. Sealant is supplied to the void space between the casings and the pipe through one of the openings or apertures. With two apertures, a uniform fill is facilitated and bubbles are more readily eliminated because gases may readily escape from one of the apertures while a mobile or flowable sealant filler composition is passed through the other into the void space.

The members of the assembly of the invention are preferably of electrically conductive metal. They are easily and inexpensively manufactured by simple stamping and bending operations. Preferably the assembly is covered with a corrosion resistant electrically insulating coating.

Many different flowable mobile sealant filler compositions essentially free of non-reactive volatile diluents or solvents (which, if present in significant amounts, cause bubble formation) may be used to fill the void space between the inner diameter or surface of the casing and the external diameter of pipe or pipes about which the casing is secured. Ordinarily, sealant compositions which are sufficiently liquid to flow from a container or bag under hand pressure at room temperature (e.g., 70° F.; 22° C.) are preferred; but those which flow under essentially identical pressure at elevated temperatures and are solid at room temperatures are also suitable to employ, provided of course the introduction of the same into the void space is accomplished under the elevated temperature conditions required for flow.

An illustrative sealant flowable only at elevated temperatures, and suitable for use in less critical applications, is asphalt. Since asphalt is thermoplastic, the only setting of the material is that accomplished by allowing the heated material to cool. Coal tar is another illustrative sealant material having a behavior comparable to asphalt. In less critical applications, it may also be suitable and practical to employ elastomeric sealants, such as, for example, polyalkylene polysulfide sealant compositions.

By far preferred are the curable or cross-linkable organic resin materials frequently classed as thermosettable or thermosetting organic resins. Among these, the most desirable are those which cure or cross-link at room temperature to form a filler mass which is infusible. An illustrative composition having such properties (e.g., readily flowable under hand pressure at room temperature and also curable at room temperature) is an epoxy resin composition such as one having, by weight, about 100 parts of a 40 percent filled (conventional inorganic filler such as clay powder) conventional liquid epoxy resin having 1,2 epoxide equivalent weight of about 185–200 grams per equivalent and a liquid Durrans mercury method softening point of about 10° C., cured by about 6 parts of diethylene triamine, of course, fillers and pigments may be added as is well known.

The sealant compositions most practical to use are either completely free of non-reactive volatile liquid diluent or solvent material, or essentially so. In the case of elastomeric as well as resinous materials, when the same are curable at room temperature (as well as, for that matter, elevated temperatures), a liquid or at least mobile and relatively non-cured (or monomeric) state for the sealant composition at room temperature is preferred.

In the method of joining lengths of pipe, an embodiment of which is illustrated by FIGURE 4, the ends of pipe are first aligned using a conventional line-up clamp. A heat-resistant tape 28 is then preferably placed around the pipes 31 at the juncture to prevent the sealant from seeping into the interior of the pipes. A glass cloth tape, suitably one coated with a pressure sensitive adhesive, if desired, is effective for this purpose. The area near the joint normally will preferably be pre-heated to approximately 150–250° C. by a hand torch, or this pre-heat step may be omitted if the ambient temperature is around 22° C. or so and a room temperature (e.g. 22° C. or so) curing resin is used. Then the lower assembly is placed around the underside of the pipe and the upper member is slid into position around the topside of the pipe. The open ends of the assembly are next plugged with putty 29 to form a complete enclosure. The putty (a conventional old material, e.g. a material having about 60 percent pulverized asbestos and mica filler with an oily hydrocarbon binder for the same) must be able to confine or act as a dam against flow of the sealant which becomes heated as it comes in contact with the preheated pipe. Putty in the area near the top of each end opening is pinched or removed to produce a tiny opening so the sealant 30 will flow out when the enclosed space is completely filled; this is particularly desirable when using a member having only a single aperture through which sealant is poured. Next the sealant 30 is inserted into the void space through an aperture of one member; and, if it is thermosetting, it is allowed to cure, which only takes a short time on the order of even minutes when the pipe is pre-heated and preferred, room temperature, fast-curing resins are employed. The resultant joint is structurally strong, having a high resistance to pull-out, and is leakproof. Because the joint can be made by a person without any special skills, the expense of joining the pipes is considerably less than would normally be the case where a welder is required.

The method of the invention for tapping into a continuous length of pipe to form a lead-off connection, e.g. a self-tapping or punch type T or L or other suitable fitting, is quite similar to the foregoing. An embodiment is illustrated in FIGURE 5. Observe that one member, preferably the upper member of the assembly is equipped with, for example a punch type T 30 pre-welded thereto. The area of pipe where the tap is to be made is first preferably pre-heated as aforenoted, to approximately 150–250° C. by a hand torch. The lower member is placed under the pipe at the spot to be tapped and the upper member with the punch T attached is slid into position on top of the pipe. The open areas at the ends of the assembly between the pipe and the assembly are normally plugged with putty as aforenoted. Putty near the top of each end of the top member is pinched or removed to permit sealant flow out when the void is completely filled. Sealant is then inserted, and if preferred practice is followed, is also allowed to cure at least partially. After the sealant has set up the punch or cutting die in the T is actuated to penetrate the pipe and form a hole or passage, thereby forming a lead-off connection. Again, the whole operation can be performed by a person with no special skills and the resultant connection is structurally strong and leakproof.

Much pipe that is used underground is covered with some type of corrosion resistant coating. Frequently, pipes are also given a lower electrical potential than surrounding soil in an effort to retard corrosion. In such cathodic protection, electrical continuity between the joined lengths of pipe is necessary. On pipes which have no coating, or which have such a coating that it will be rubbed off by the assembly of this invention when the same is fastened to the pipe, there is no problem in gaining electrical continuity between the same and metal members of the invention. But, on pipes which have a hard insulating coating, it is necessary, if electrical continuity is to be maintained, to scrape the coating off in the vicinity where the indentations or spacers 26 of the assembly contact the pipe; and the assembly is appropriately made of electrically conductive material. As an alternative to scraping off a coating before the assembly is fastened to the pipe, screws or other metal pieces may readily be placed at the point where the resin flows through the putty, which pieces scrape into contact with the assembly and each length of pipe.

The method of the invention disclosed in this application can also be used to seal holes or cracks in pipes. The hole or crack is first sealed off by application of a suitable temporary sealant and then the pipe is pre-heated, followed by application of the assembly, putty, and permanent sealant to produce an effective, permanent, and quick seal of the hole or crack.

It will be understood that various changes in the details, which have been described and illustrated in order to explain the nature of the invention, may be made by those skilled in the art within the principle and scope of the invention as expressed in the claims.

That which is claimed is:

1. A method of making an in-line connection to a continuous length of pipe, which method comprises:
    (a) heating the pipe in the area where the connection is to be made;
    (b) affixing an assembly comprising a pair of semi-cylindrical sections with laterally extending flanges interlocked by axially sliding said sections around the pipe in the heated area for providing a mold and to which a self-punching lead-off fitting has been pre-fastened to one of said sections;
    (c) closing the open ends of the assembly thereby creating an enclosed mold;
    (d) filling the area between the assembly and pipe with a sealant;
    (e) allowing the sealant to set up into a hardened condition; and
    (f) actuating the punch to make an in-line connecting hole through the sealant and in the pipe.

References Cited

UNITED STATES PATENTS

| | | | |
|---|---|---|---|
| 647,996 | 4/1900 | Smith | 285—294 X |
| 873,689 | 12/1907 | Van Winkle | 285—294 X |
| 875,729 | 1/1908 | O'Brien | 285—294 X |
| 924,262 | 6/1909 | Moll | 285—419 X |
| 978,346 | 12/1910 | Yarrow | 285—294 |
| 2,128,720 | 8/1938 | Tweedale | 285—424 X |
| 2,180,695 | 11/1939 | Rembert | 264—262 |
| 3,070,874 | 1/1963 | Davis | 29—157 |
| 3,177,528 | 4/1965 | Flower et al. | |

CHARLIE T. MOON, Primary Examiner

U.S. Cl. X.R.

29—455, 460, 463; 137—15; 264—242